United States Patent [19]
Aoki et al.

[11] Patent Number: 5,841,535
[45] Date of Patent: *Nov. 24, 1998

[54] MULTIAXIS DISTANCE MEASURING DEVICE REQUIRING ALIGNMENT ALONG ONLY ONE AXIS

[75] Inventors: Tatsuya Aoki; Kazunori Tanaka, both of Kanagawa, Japan

[73] Assignee: Sokkia Company Limited, Tokyo, Japan

[ * ] Notice: This patent issued on a continued prosecution application filed under 37 CFR 1.53(d), and is subject to the twenty year patent term provisions of 35 U.S.C. 154(a)(2).

[ * ] Notice: The term of this patent shall not extend beyond the expiration date of Pat. No. 5,808,740.

[21] Appl. No.: 686,606

[22] Filed: Jul. 26, 1996

[30] Foreign Application Priority Data

Aug. 31, 1995 [JP] Japan .................................... 7-223500

[51] Int. Cl.⁶ ...................................................... G01B 9/02
[52] U.S. Cl. ............................................ 356/345; 356/358
[58] Field of Search ...................................... 356/345, 358

[56] References Cited

U.S. PATENT DOCUMENTS 4,976,019  12/1990  Kitamura ................................ 356/358
5,369,488  11/1994  Morokuma .............................. 356/358

FOREIGN PATENT DOCUMENTS

62-274202  11/1987  Japan .
210201   1/1990  Japan .
222503   1/1990  Japan .
5306904  11/1993  Japan .

*Primary Examiner*—Robert Kim
*Attorney, Agent, or Firm*—Sixbey Friedman Leedom & Ferguson; Thomas W. Cole

[57] ABSTRACT

A multiaxis distance measuring device is provided that includes a multiaxis interferometer 14 includes a rectangular box-shaped housing 30, a mounting base 32 disposed within the housing 30, a stage 38 set in a parallelly movable manner via slider 36, and an interferometer body 42 set on the stage 38 via mounting block 40. Interferometer body 42 is partitioned into parts A, B, C, and D, which have as an optical part in common, a polarization beam splitter 68, which is disposed along the longitudinal direction of stage 38 with its lower side facing a laser entrance hole 62 and its upper side face facing a laser exit hole 64. Part A is provided with only a ¼ wave plate 70. Part B is provided with a pentagonal prism 72 and a ¼ wave plate 70 so that its light emission direction is pointed downwards. Part C is provided with a pentagonal prism 72 and a ¼ wave plate 70 so that its light emission direction is pointed upwards, while part D is provided with a pentagonal prism 72 and a ¼ wave plate 70 so that its light emission direction is pointed to the side. The device advantageously requires only a single alignment between the optical axis of the multiaxis interferometer 14 and the reflecting target and can measure distances in at least two orthogonal directions.

6 Claims, 9 Drawing Sheets

optical path of A

FIG. 5(a)

optical path of B

FIG. 5(b)

optical path of C

FIG. 5(c)

optical path of D

MULTIAXIS DISTANCE MEASURING DEVICE REQUIRING ALIGNMENT ALONG ONLY ONE AXIS

BACKGROUND OF THE INVENTION

The present invention relates to multiaxis distance measuring devices and more particularly to length measuring devices which enable the length measurement of a plurality of axes to be made upon performing a setting procedure once.

Laser distance measuring devices are known for measuring the movement distance of an X, Y table or various other types of NC machine tools with high accuracy. Such a type of laser distance measuring device has a basic arrangement comprised of a laser head, which is equipped with a laser beam emitting part and an interference beam receiving part, a target prism (corner cube), which reflects the laser beam emitted from the laser beam emitting part, and an interferometer, which is disposed between the above parts.

Figure 9:
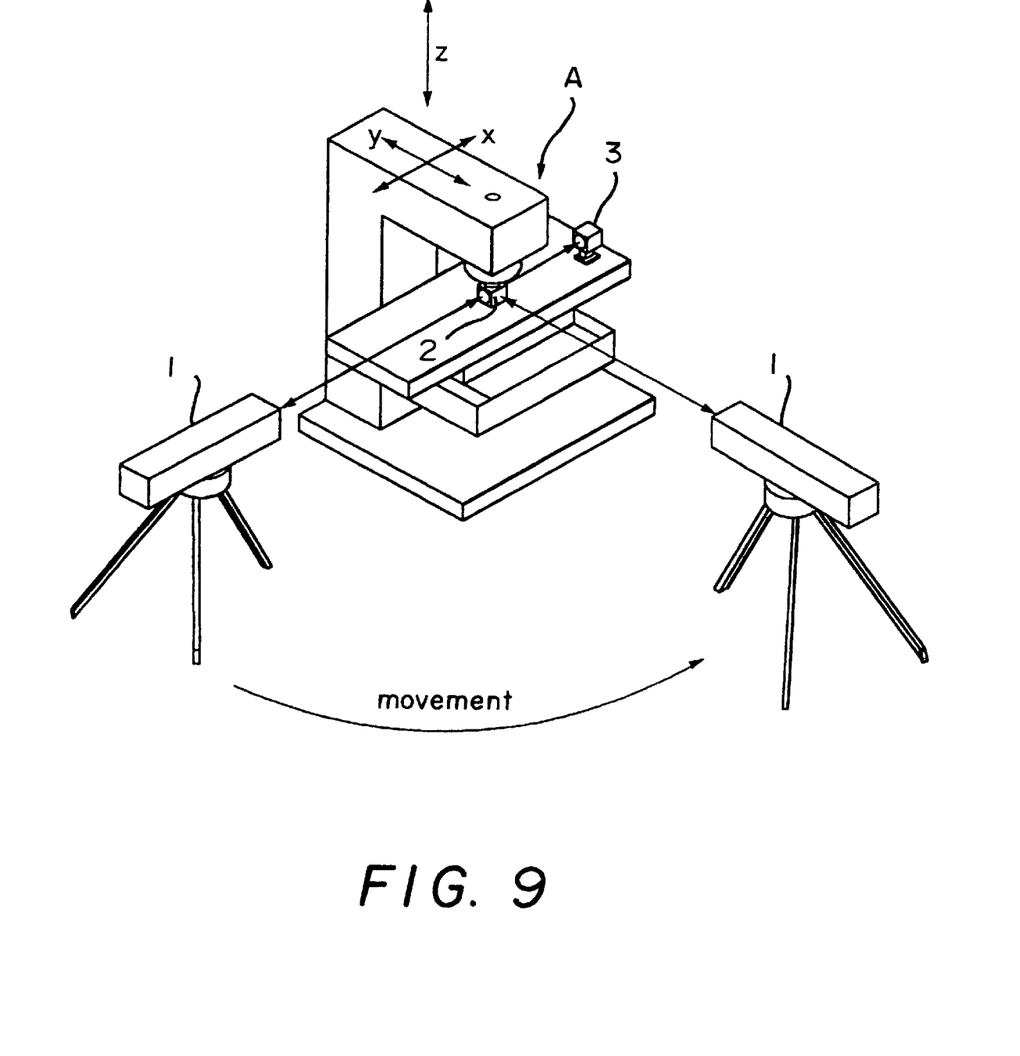
FIG. 9 is a schematic diagram which shows the layout of a prior art distance measuring device as applied to a knee type vertical milling machining.

To use such a type of distance measuring device, for example, to measure the movement distance of a numerically controlled machine tool (hereinafter called NC machine tool), the target prism is fixed on the moving table or the spindle. The directions of movement of the NC machine tool usually consist of the three axial directions x, y, and z, and, if length measurements of a movable table of a knee type vertical milling machine A are to be made for example as shown in FIG. 9, the laser head 1 is first fixed on a tripod by a worker so that it faces the x axis direction, the interferometer 2 is then set at a position on the spindle of milling machine A and fixed to be in alignment with the optical axis of the laser head, and the target prism 3 is fixed on the movable table along the extension of said optical axis.

This procedure is usually referred to as alignment and it takes about 15 minutes of working time to align each optical axis, etc.

After the x axis alignment work, distance measurements are made while actually moving the table in the x axis direction and the accuracy of movement, etc. are checked. When the measurements for the x axis direction have been completed, the laser head 1, interferometer 2, and target prism 3 are arranged by the worker to face the y axis direction in a manner similar to the work performed for the x axis and after the y axis alignment work has been completed, the length measurements in the y axis direction are made through similar operations. Thereafter, the z axis alignment work is performed and distance measurements are made again in a similar manner.

However, the following technical problem has been raised concerning such a conventional distance measuring method.

That is, with the distance measurement method described above, since the optical axes must be aligned for each axis (x, y, z), the alignment work requires much time and complicated work had to be repeated a plurality of times. Improvements were thus strongly desired.

The present invention was made to resolve such a problem, and it is therefore an object of the invention to provide a multiaxis distance measuring device which enables distance measurements to be made for a plurality of axes upon performing the alignment work only once.

SUMMARY OF THE INVENTION

In order to achieve the above object, the present invention provides a multiaxis distance measuring device comprising a laser head equipping a light emitting part for emitting a laser beam and a light receiving part for receiving an interference beam, a multiaxis interferometer which is disposed along the optical axis of the light emitting part and the light receiving part and equipped with an optical refraction mechanism for splitting the incident laser beam into at least two orthogonal directions and a switching mechanism for the optical refraction mechanism, one or more reflecting targets which are fixed to the measurement position on the measured object and which receive the laser beam emitted from the above-mentioned optical refraction mechanism and reflect the laser beam towards the multiaxis interferometer, and a controller for controlling the switching mechanism.

With a measuring device with the above arrangement, one needs to perform the optical axis alignment of the multiaxis interferometer and the reflecting target only once and can make length measurements in at least two orthogonal directions by operating the switching mechanism to switch the direction of emission of the multiaxis interferometer.

The multiaxis interferometer with the above function can be comprised of a casing with an entrance/exit holes opened to face the laser head, a stage, which is provided within the casing and is movably guided in a direction orthogonal to the optical axis of the laser head, an interferometer body having a plurality of light splitting mechanisms which are arranged in a single row on the stage so as to face the entrance/exit part and are combined so as to re-emit the incoming laser beam in at least two orthogonal directions, a moving mechanism which moves the stage rectilinearly to cause one of the light splitting mechanisms to face the entrance/exit holes, and a detection means for detecting the stoppage position of the stage.

A primary advantage of the multiaxis distance measuring device according to the invention is to enable length measurements for at least two orthogonal directions upon performing the alignment work for the optical axes of the interferometer and the reflecting targets just once. Thus the efficiency of length measurements is raised while the number of troublesome alignment operations is reduced.

BRIEF DESCRIPTION OF THE DRAWINGS

In order that the device by which the above-recited objects and advantages of the invention are achieved can be understood in detail, a more particular description of the invention will now be made by reference to a specific embodiment thereof which are illustrated in the accompanying drawings, which drawings form part of this specification.

IN THE DRAWINGS

DESCRIPTION OF THE PREFERRED EMBODIMENT

A preferred embodiment of the present invention shall now be described in detail with reference to the attached drawings. FIGS. 1 to 6 show a preferred embodiment of the multiaxis distance measuring device according to the present invention. As can be seen from the overall arrangement shown in FIG. 1, the distance measuring device shown in these Figures is comprised of a laser head 12 with built-in light emitting and receiving parts, a multiaxis interferometer 14, a plurality of reflecting targets 16, a display 18 connected to laser head 12, and a controller 24 for the multiaxis interferometer 14.

Figure 1:
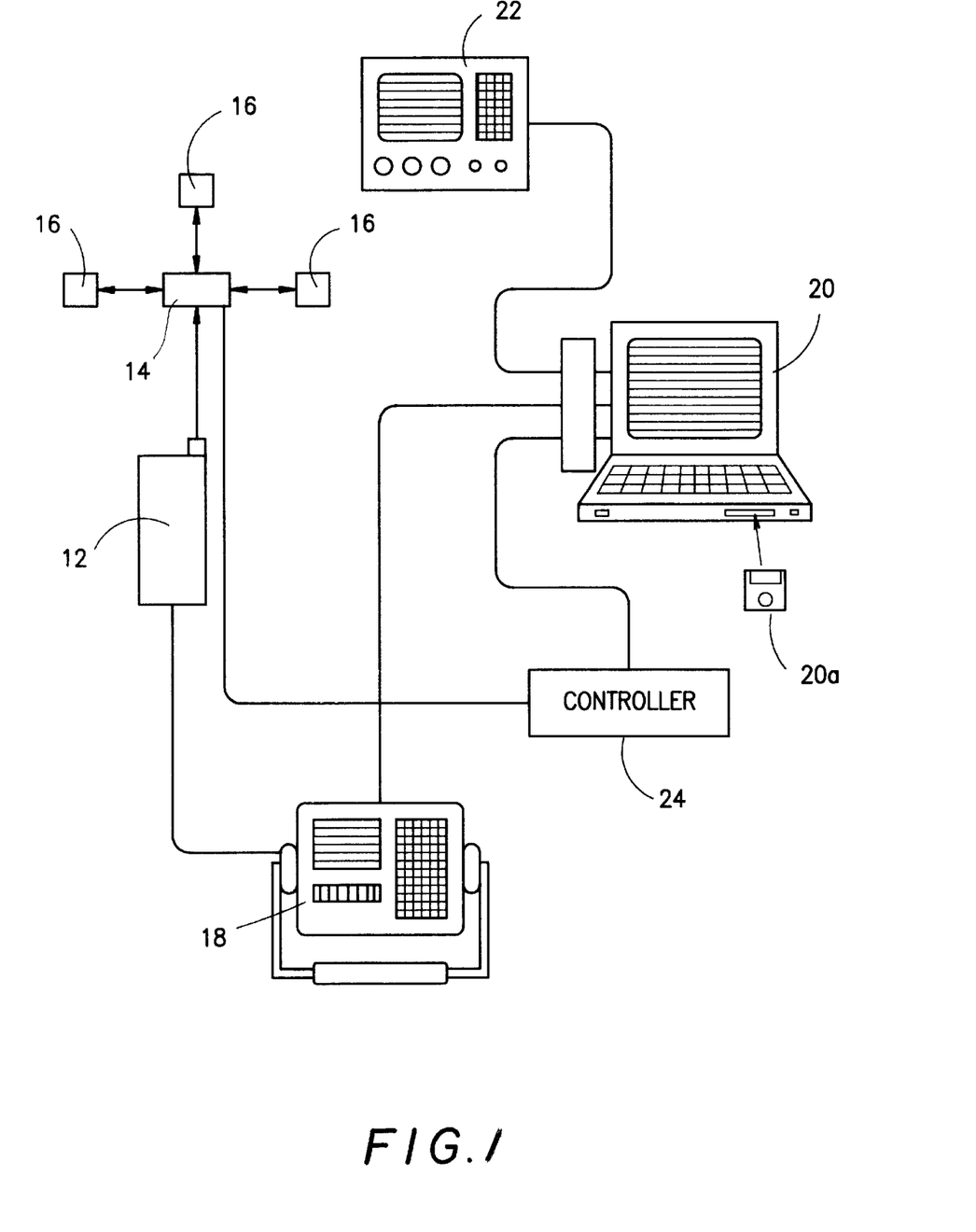
FIG. 1 is a view showing the overall arrangement of one embodiment of the multiaxis distance measuring device according to the present invention.

The laser head 12 is equipped with a light emitting part for emitting a laser beam of a certain wavelength and a light receiving part for receiving the interference beam resulting from the interference of light at the multiaxis interferometer 14. The interference fringes of the interference beam received by this light receiving part are counted to calculate the distance from the multiaxis interferometer 14 to reflecting target 16 and this calculation result is displayed on the display 18.

Figure 2:
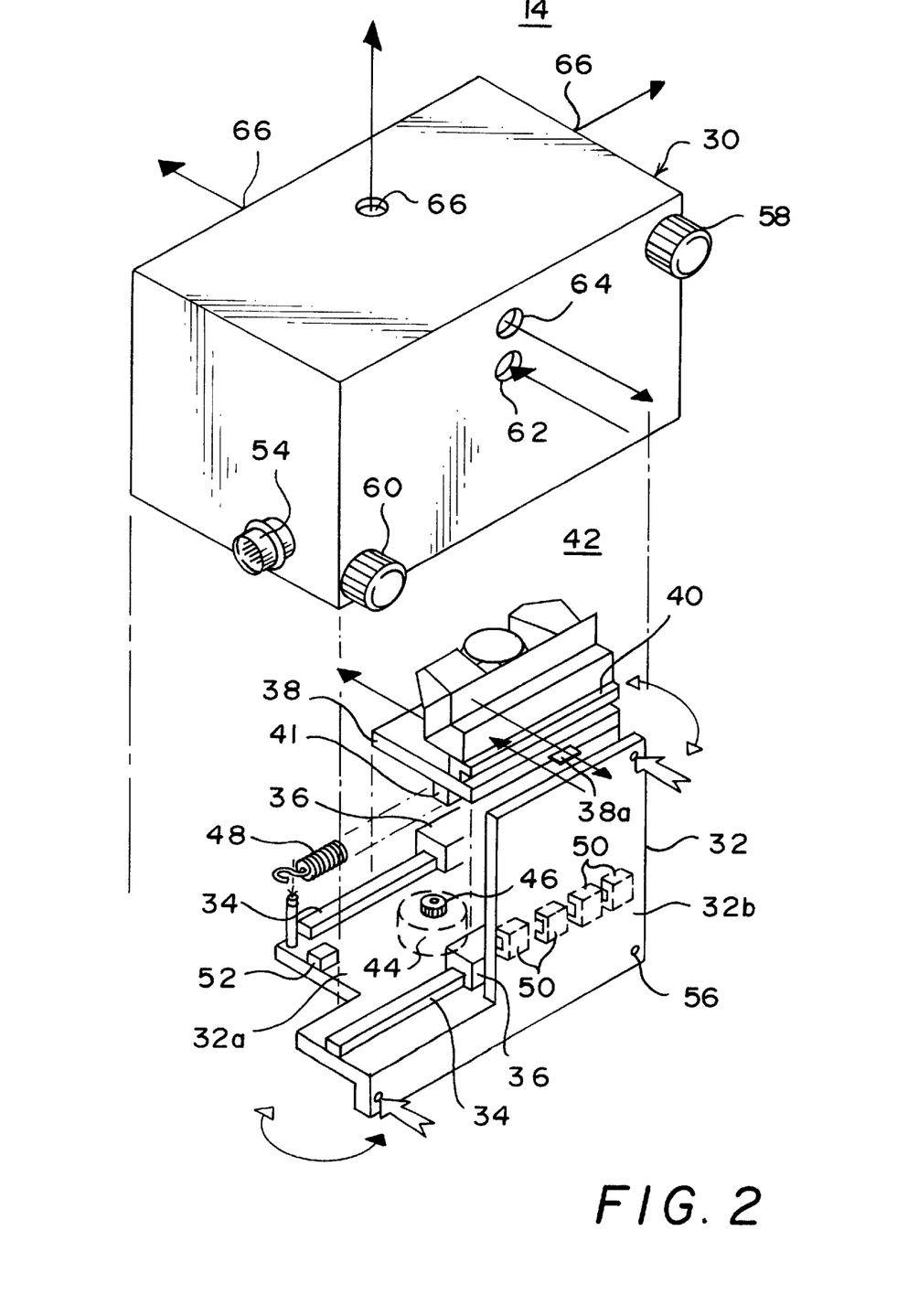
FIG. 2 is an exploded perspective diagram of the overall structure of the multiaxis interferometer of said multiaxis distance measuring device.
Figure 3:
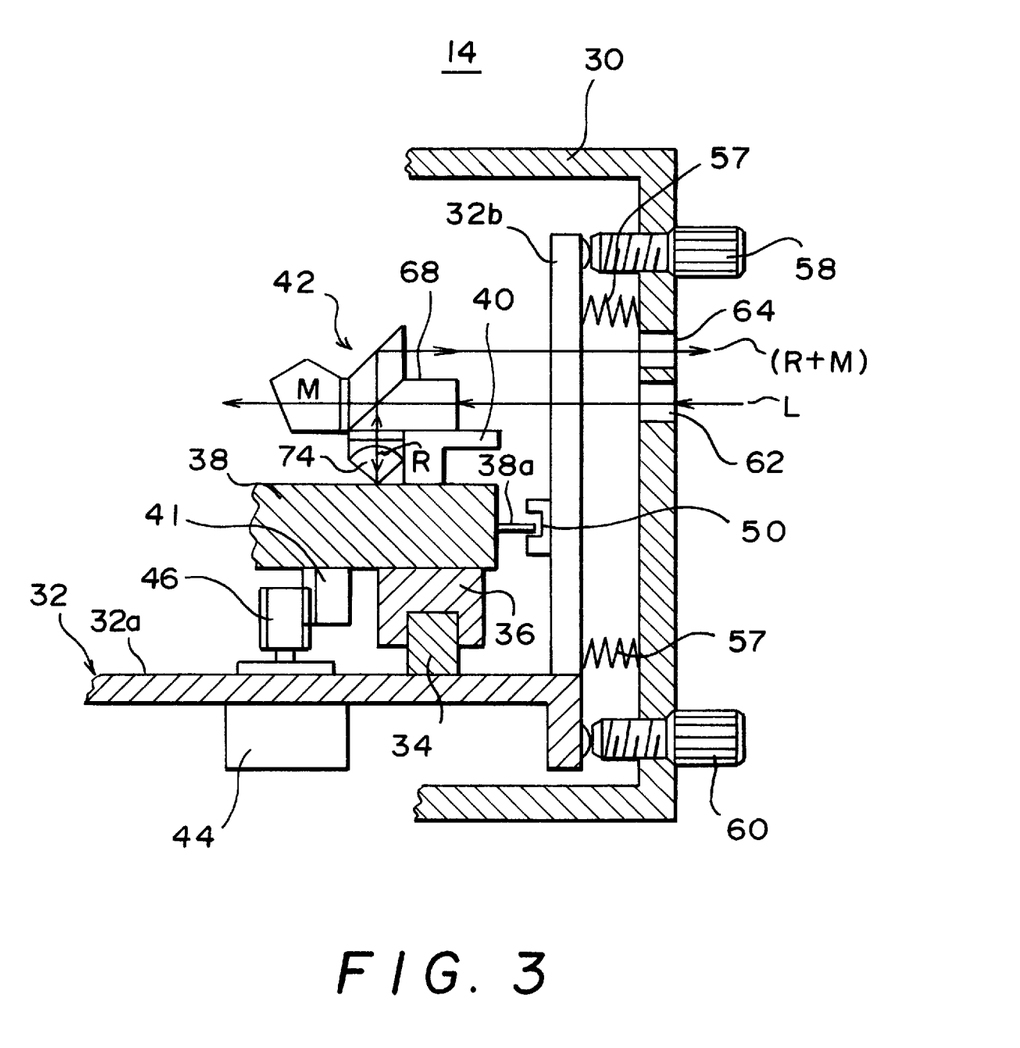
FIG. 3 is a cross-sectional view of said interferometer.

FIGS. 2 to 6 show structural details of the multiaxis interferometer 14. FIG. 2 is an exploded perspective view of the overall structure of the multiaxis interferometer 14 and FIG. 3 shows the cross-sectional structure of a part of the multiaxis interferometer 14.

The multiaxis interferometer 14 according to the present embodiment is formed in a box shape and is generally comprised of a rectangular box-shaped housing 30, an L-shaped mounting base 32 housed within the housing 30, a stage 38, which is set in a parallelly movable manner via sliders 36 on a pair of linear guides 34 which are set in a parallel manner on the upper face of horizontal part 32a of mounting base 32, and an interferometer body 42, which is set on the stage 38 via a mounting block 40.

A rack 41, which is parallel to the linear guides 34, is provided on the lower face of stage 38. This rack 41 is engaged with a pinion 46 attached to the output shaft of an ultrasonic motor 44 provided on the lower face of horizontal part 32a. The stage 38 is thus made movable along linear guides 34 in accordance with the normal and reverse rotation of motor 44. A tension spring 48 is spanned across the end part of stage 38 and mounting base 32 and the backlash of the rack 41 and pinion 46 mechanism is prevented by the urging force of this tension spring 48.

A plurality of position detection photointerrupters 50 are fixed along a straight line on the inner side of vertical part 32b of mounting base 32 and the position of stage 38a is detected when a detection piece 38a provided on the side of stage 38 blocks the gap between the light emitting part and the light receiving part of a photointerrupter 50.

Furthermore, on both ends in the longitudinal direction of the horizontal part 32a (of which only one end is shown in the FIG. 2 and FIG. 3), are fixed limit switches 52 which, upon coming into contact with the stage 38, respectively detect the start-of-movement and end-of-movement positions of stage 38.

The lead wires of motor 44, photointerrupters 50, and limit switches 52 are connected to the controller 24 via a connector 54, which is disposed on one side of the housing 30.

The corner of one side of the vertical part 32b of the mounting base 32 is coupled via a spherical bearing 56 to the inner side of the front face of the housing 30 and is supported to the inner side of the front face of housing 30 by means of a plurality of tension springs 57.

On the upper part of the front face of housing 30 is provided a vertical direction adjusting knob 58, which is located along the vertical extension of a spherical bearing 56 and in contact with the front face of the vertical part 32b. By pushing the upper part of the vertical part 32b by screwing in the adjusting knob 58, the angle in the vertical direction of mounting base 32 may be adjusted finely against the spring force of tension springs 57.

Also, on the lower part of the front face of the housing 30 is provided a parallelism adjusting knob 60, which is located along the horizontal direction of spherical bearing 56 and in contact with the front face of vertical part 32b. The parallelism of mounting base 32 can be adjusted by operating adjusting knob 60.

Furthermore, on the upper central part of the front face of the housing 30 is opened an entrance hole 62 for introducing in the laser beam emitted from laser head 12 and above this entrance hole 62 is provided an exit window part 64 for transmitting the interference light from the interferometer 14. On the centers of the upper and lower faces, on the rear face, and on one side (the side opposite the face on which connector 54 is mounted) of the housing 30 are opened laser entrance/exit holes 66, which respectively face the x, y, and z axis directions. The interferometer body 42 is moved to be aligned with these holes.

Figure 4A:
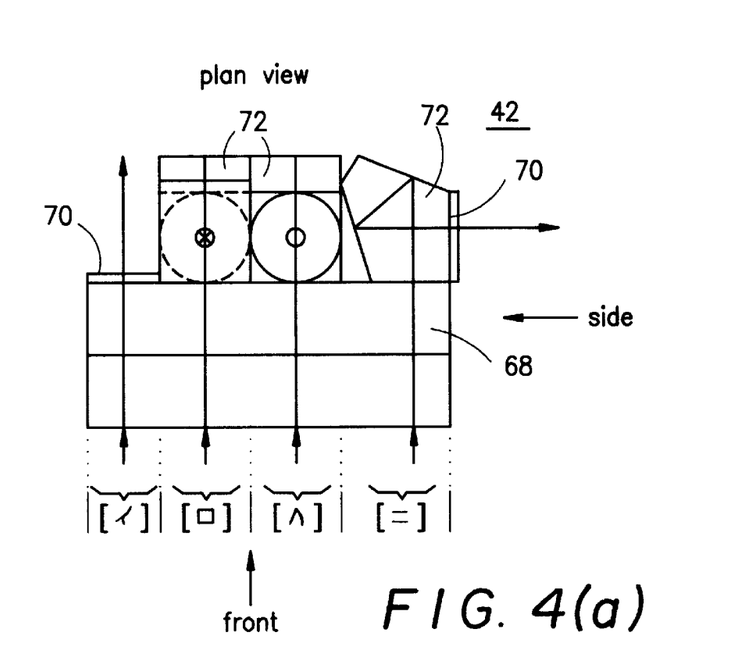
FIG. 4 is a drawing showing three views of the interferometer body of said interferometer.
Figure 4B:
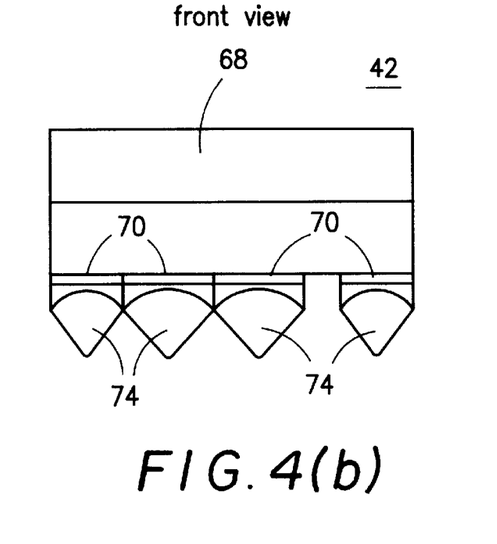
Figure 4C:
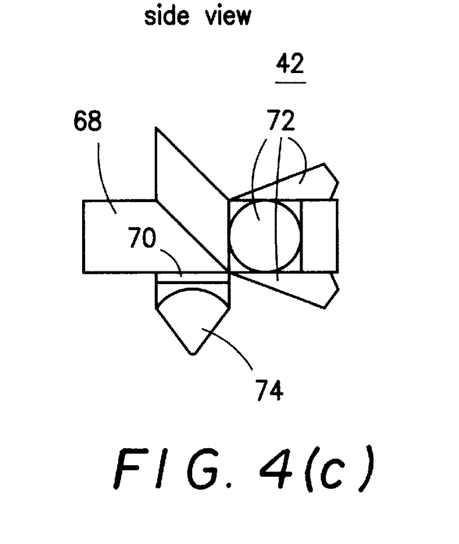
Figure 5A:
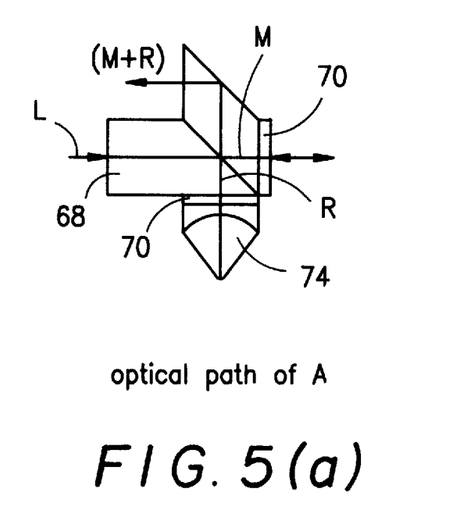
FIGS. 5(a) to (d) are cross-sectional views of the respective parts in the plan view of FIG. 4.
Figure 5B:
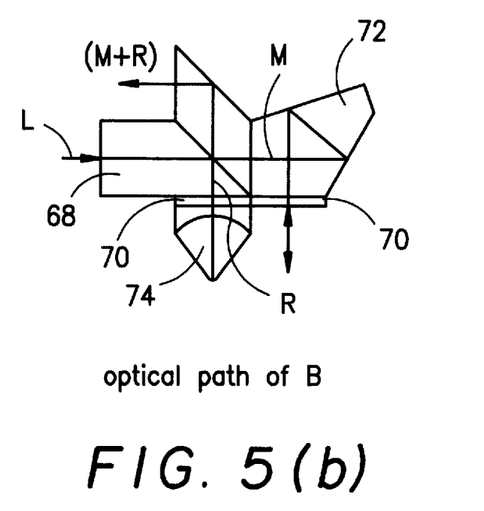
Figure 5C:
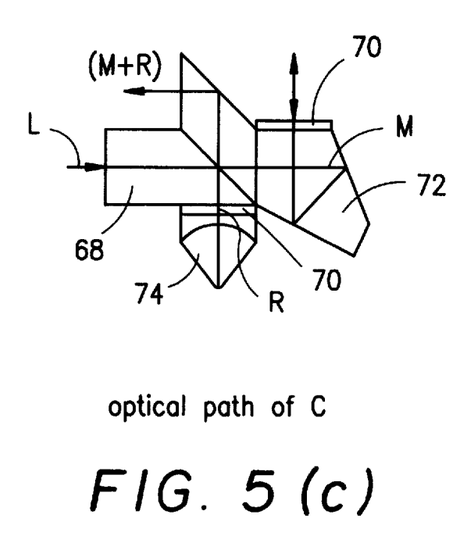
Figure 5D:
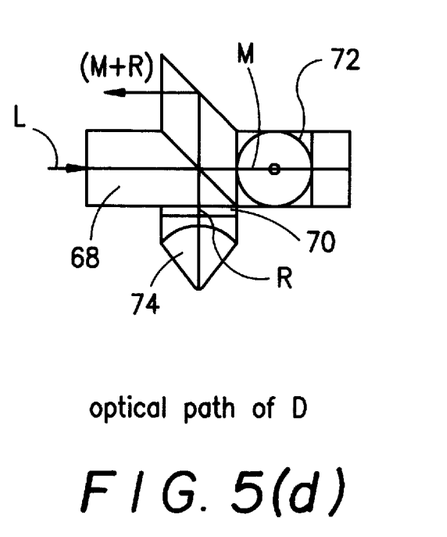
Figure 6:
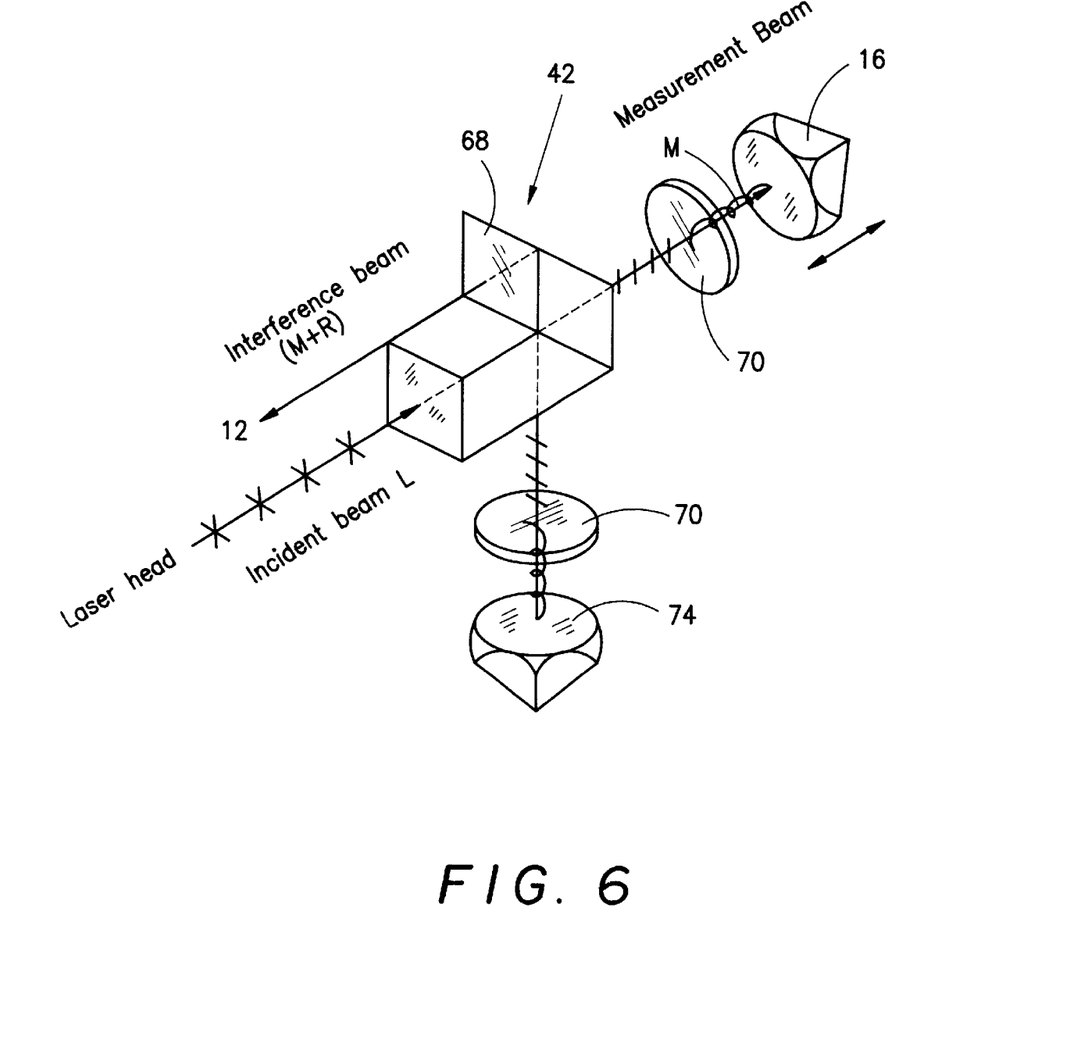
FIG. 6 is a schematic diagram which shows the measurement principles of the interferometer body.

FIGS. 4 to 6 show structural details of the interferometer body 42. The interferometer body 42 is partitioned into parts A, B, C, and D, having polarization beam splitter 68, which is disposed along the longitudinal direction of stage 38 with its lower side face facing entrance hole 62 and its upper side face facing laser exit hole 64, as an optical component in common. Part A has only an ¼ wave plate 70 disposed along the longitudinal direction on the measuring beam emission surface of polarization beam splitter 68, part B has a pentagonal prism 72, which comprises the optical refraction mechanism, disposed with its light emission direction being pointed downwards and an ¼ wave plate 70 disposed on the light emission surface of pentagonal prism 72, part C has a pentagonal prism 72 disposed with its light emission direction being pointed upwards and an ¼ wave plate 70 disposed on the light emission surface of pentagonal prism 72, and part D has a pentagonal prism 72 disposed with its light emission direction being pointed to the side and an ¼ wave plate 70 disposed on the light emission surface of pentagonal prism 72.

Four fixed corner cubes 74, which reflect the reference and measuring beams split by polarization beam splitter 68 back to the upper side of polarization beam splitter 68, are respectively disposed via the ¼ wave plates 70 on the lower central parts of the above parts A to D.

FIG. 6 shows the measurement principles of the optical system of the interferometer body 42. Although only the optical path for part A is shown in this example, the measurement principles are the same for the other parts except that the optical path is bent by a pentagonal prism 72.

As shown in this Figure, the 45° linearly polarized incident beam L, which is emitted from the laser head, is split by the polarization beam splitter 68 into the reference beam R, which propagates towards the fixed corner cube 74, and the measuring beam M, which propagates towards reflecting target 16 disposed at the measurement position. The reference and measuring beams R and M then pass through the ¼ wave plates 70 and are thereby circularly polarized.

Upon being respectively reflected by the corner cube 74 and reflecting target 16, the reference and measuring beams R and M become circularly polarized in the reverse rotation direction and upon passing through the ¼ wave plates 70 again, become linearly polarized beams with a polarization angle that differs by 90° with respect to the polarization angle at the time of initial passage through the ¼ wave plates 70.

The measuring beam M, which was initially transmitted through the polarization beam splitter 68, is now reflected by the beam splitter 68 and the reference beam R, which was initially reflected by polarization beam splitter 68, is now transmitted through the beam splitter 68 and in this process, the measuring beam M and the reference beam R interfere with each other. The interference beam (M+R) passes above the incoming beam L and is received by the light receiving part of laser head 12 via the laser exit hole 64.

If the position of reflecting target 16 is moved forward or backward in the meantime, the interference fringes of interference beam (M+R) changes. Thus, by electrically counting the amount of this change, the distance from beam splitter 68 to reflecting target 16 is measured and this measurement result is displayed on display 18.

FIG. 5 shows the details of the respective optical paths of the four parts A to D of the interferometer body 42 described above. At part A, shown in (a) of said FIG. 5, the incident beam L is split into measuring beam M, which is rectilinearly transmitted through polarization beam splitter 68, and reference beam R, which proceeds downwards so as to be orthogonal to measuring beam M, and the interference beam (M+R) passes above and in the reverse direction of incident beam L.

At part B, although the reference beam R and interference beam (M+R) travel along the same optical paths as those of part A, the measuring beam M is reflected by pentagonal prism 72 and proceeds parallel to and in the same direction as reference beam R towards reflecting target 16.

At part C, although the reference beam R and interference beam (M+R) travel along the same optical paths as those of part A, the measuring beam M is reflected by pentagonal prism 72 and proceeds parallel to but in the opposite direction of reference beam R towards reflecting target 16.

At part D, although the reference beam R and the interference beam (M+R) travel along the same light paths as those of part A, the measuring beam M is reflected by pentagonal prism 72 and proceeds towards reflecting target 16 in the direction orthogonal to the optical axis of incident beam L.

Figure 7:
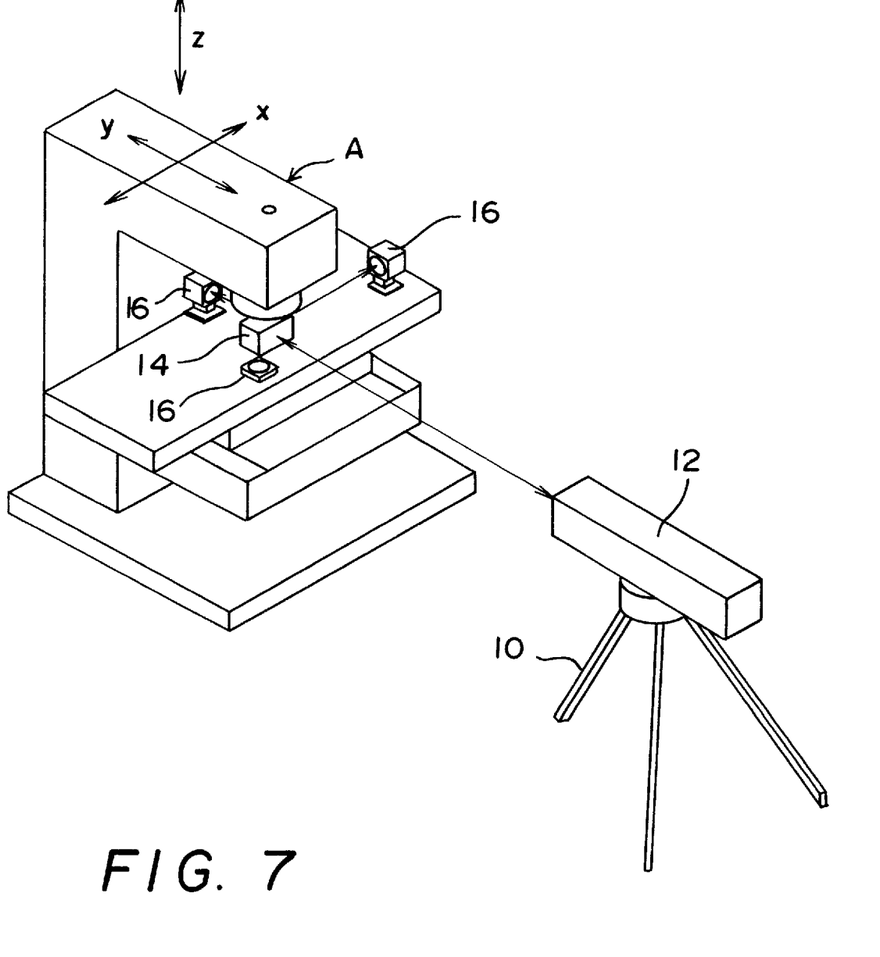
FIG. 7 is a schematic diagram which shows the layout for the case where the multiaxis distance measuring device of the present invention is applied to a knee type milling machine.

An example of how a multiaxis measuring device with the above arrangement is used shall now be described with reference to FIGS. 7 and FIG. 8. This usage example is one in which the multiaxis measuring device according to the present invention is applied to the measurement of the accuracies of movement of the three axes of an NC machine tool (specifically, the milling machine A) and to the correction of these accuracies. FIG. 7 shows the condition in which this multiaxis measuring device is applied.

As shown in this FIG. 7, a laser head 12, in which light emitting and receiving parts are built in, is supported on a tripod 10 and set to face the front face of milling machine A, which is the measured object. The multiaxis interferometer 14 is fixed on the spindle position, which is a fixed member of milling machine A, for example, by being attached to the spindle unit or by the use of magnets, etc.

At movable parts of milling machine A in the x axis direction and the y axis direction of the table and in the z axis direction, which is directly below the multiaxis interferometer 14, are respectively fixed and disposed reflecting targets 16 in a manner facing the interferometer 14.

With the multiaxis interferometer 14 in the present example, the abovementioned part A is set to be aligned with the y axis direction, part B is set to be aligned with the z axis direction, and part D is set to be aligned with the x axis direction. The optical axis of laser head 12 is set on entrance and exit holes 62 and 64 of the multiaxis interferometer 14. Such alignment work for measurement is completed upon performing it once at the beginning and measurements of milling machine A are thereafter made in a fully automatic manner with the laser head 12, multiaxis interferometer 14, and reflecting targets 16 being fixed.

The initial alignment work performed by the worker for measurement will consist of aligning the optical axes in the three directions and setting the home positions in the three directions. This work will be completed in approximately 25 minutes. As shown in FIG. 1, computer 20 is connected with controller 24 and display 18 as well as the NC controller 22, which is provided with the NC machine tool.

The measurement program is written into a floppy disk 20a, etc. which is loaded into computer 20 and the distance measurement and the correction work are performed in accordance with this program.

Figure 8:
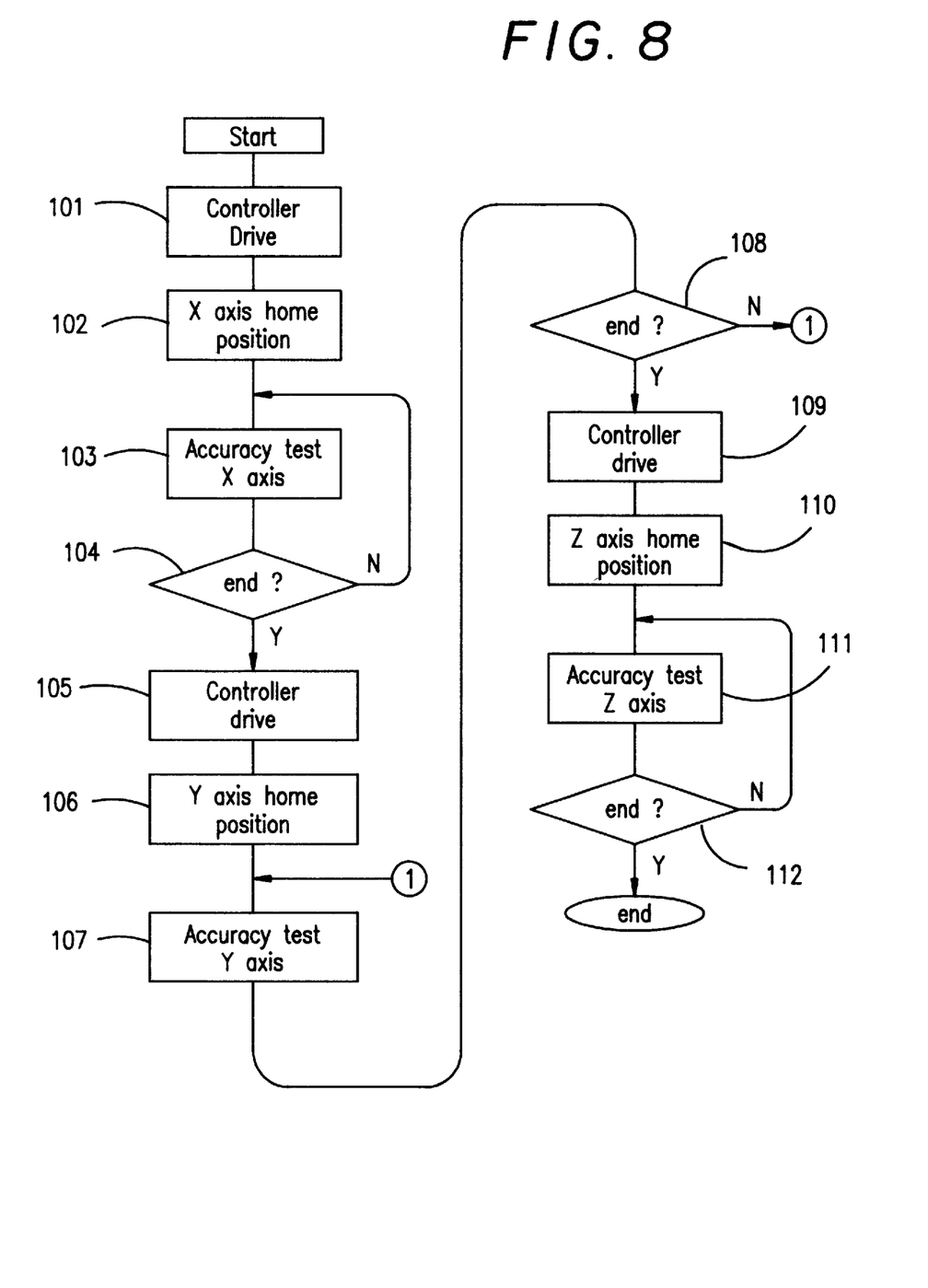
FIG. 8 is a flowchart which shows one example of a measurement process procedure using the multiaxis distance measuring device according to the present invention.

FIG. 8 shows an example of such a measurement program. When the procedure shown in this FIG. 8 starts, command signals are transmitted to controller 24 at step 101 and motor 44 is driven to set part D of the interferometer body 42 at a position where it faces the entrance and exit holes 62 and 64.

Next, at step 102, control signals are transmitted to NC controller 22 and upon receiving these signals, NC controller 22 moves milling machine A and positions it at the home position along the x axis. At step 103, drive commands are sequentially provided to NC controller 22 of milling machine A in accordance with the contents of the measurement software program in floppy disk 20a loaded in computer 20 to thereby operate milling machine A according to a prescribed procedure.

The measurement result data, which change in accordance with such operations, are then compared with reference data incorporated in the program and the comparison results are used to calculate correction data, such as the pitch error, and these correction values are taken in by NC controller 22.

The accuracy tests for such a case may include the repeated positioning accuracy test, the repeatedly reversed positioning accuracy test, ISO-230-2, etc. Although the working time will differ according to the test items, it will be approximately 50 minutes as in conventional cases.

When it has been judged at step 104 that all of the tests for the x axis have been completed, computer 20 commands the start-up of controller 24 at step 105 to cause the switching mechanism of the interferometer 14 to perform the switching operation so that the measurement optical axis will be switched to the y axis. To be more specific, motor 44 is driven so that part A of the interferometer body 42 will be selected and set to the position where it faces entrance hole 62 and exit hole 64.

After this switching operation has been confirmed, the various accuracy tests for the y axis are performed according to procedures similar to those described above (steps 106 to 108) and when it is judged at step 108 that the measurements for the y axis have ended, the measurement optical axis is switched to the z axis and procedures similar to the above are repeated. After the completion of the accuracy tests for the z axis, the system is stopped (steps 109 to 112).

The total working time for the above process is about 175 minutes and since the automatic measurement time, from which the time for initial alignment by the worker is excluded, is 150 minutes, the worker is provided with adequate spare time which may be used effectively for other work and since practically all of the work is completed after the completion of the work by the worker, the equipment can be left alone thereafter and the worker will not have to be troubled by the management of working time.

Although an example in which the multiaxis distance measuring device of the present invention is applied to the distance measurement and correction of an NC machine tool was given as an usage example above, the measuring device of the present invention is not restricted to such an usage example and may be used, for example, for an object of measurement which moves in two axial directions, such as an X, Y table and in this case, the emission directions of the multiaxis interferometer 14 may be selected for two orthogonal directions.

What is claimed:

1. A multiaxis distance measuring device comprising:
   a laser head including a light emitting part for emitting a laser beam and a light receiving part including only a single interference detector for receiving an interference beam,
   a multiaxis interferometer that is structurally independent of and spaced apart from said laser head and which is disposed on the optical axis of the light emitting part and the light receiving part and equipped with a plurality of light splitting mechanisms for splitting the incident laser beam into at least two orthogonal directions, each of which is manually mounted so as to be positionable in front of said laser beam emitted by said laser head and which includes a switching means for the light splitting mechanisms for moving the mechanisms and switching the direction of said laser beam and allowing only a single distance along one of said multiple axes to be measured at any one time, all of said distances being measured by said single interference detector,
   one or more reflecting targets which are fixed to the measurement position on the measured object and which receive the laser beam emitted from the above-mentioned beam splitting mechanisms and reflect the laser beam towards the multiaxis interferometer, and
   a controller for controlling the switching mechanism.

2. A multiaxis distance measuring device as set forth in claim 1, wherein the multiaxis interferometer comprises:
   a casing with an entrance hole and exit hole opened to and facing the laser head,
   a stage which is provided within the casing and is movably guided in a direction orthogonal to the optical axis of the laser head,
   an interferometer body supporting said plurality of light splitting mechanisms which are arranged in a single row on the stage so as to face the entrance hole and exit hole and are combined so as to re-emit the incident laser beam in at least two orthogonal directions,
   a moving mechanism which moves the stage rectilinearly to cause one of the light splitting mechanisms to face the entrance and exit holes, and
   a detection means for detecting a stoppage position of the stage.

3. A multiaxis distance measuring device as set forth in claim 1, wherein said targets are arranged orthogonally with respect to said multiaxis interferometer.

4. A multiaxis distance measuring device as set forth in claim 1, wherein each of said light-splitting mechanisms directs said laser beam emitted by said laser head along a different axis.

5. A multiaxis distance measuring device as set forth in claim 4, wherein said plurality of light-splitting mechanisms is linearly arranged on a stage which is movably guided in a direction orthogonal to said laser head.

6. A multiaxis distance measuring device as set forth in claim 5, wherein said multiaxis interferometer includes a moving mechanism for moving the stage in response to a signal from said switching means such that one of said light-splitting mechanisms is positioned to receive said laser beam.

* * * * *